(12) United States Patent
Lee et al.

(10) Patent No.: US 8,804,082 B2
(45) Date of Patent: Aug. 12, 2014

(54) LIQUID CRYSTAL DISPLAY

(75) Inventors: Seong Young Lee, Anyang-si (KR); Jae-Ho Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 253 days.

(21) Appl. No.: 13/199,470

(22) Filed: Aug. 31, 2011

(65) Prior Publication Data
US 2012/0257155 A1   Oct. 11, 2012

(30) Foreign Application Priority Data
Apr. 8, 2011   (KR) ........................ 10-2011-0032590

(51) Int. Cl.
*G02F 1/1343* (2006.01)
*G02F 1/136* (2006.01)

(52) U.S. Cl.
CPC .................. *G02F 1/134309* (2013.01); *G02F 2001/134318* (2013.01)
USPC ........................................... 349/143; 139/48

(58) Field of Classification Search
CPC ........ G02F 2001/134318; G02F 2001/134345; G02F 1/13624; G02F 2001/136222; G02F 1/1368
USPC ........................................... 349/139, 143, 48
See application file for complete search history.

(56) References Cited

U.S. PATENT DOCUMENTS

| | | | |
|---|---|---|---|
| 6,069,678 A | 5/2000 | Sakamoto et al. | |
| 6,449,027 B2 | 9/2002 | Lee et al. | |
| 7,746,436 B2 * | 6/2010 | Shin et al. | 349/129 |
| 7,787,091 B2 | 8/2010 | Horiguchi et al. | |
| 7,847,906 B2 * | 12/2010 | Tak | 349/143 |
| 7,868,956 B2 * | 1/2011 | Kim et al. | 349/39 |
| 7,889,293 B2 * | 2/2011 | Kim et al. | 349/106 |
| 8,159,641 B2 * | 4/2012 | Ham et al. | 349/139 |
| 2004/0160560 A1 * | 8/2004 | Kim et al. | 349/129 |
| 2004/0227888 A1 * | 11/2004 | Tak et al. | 349/139 |
| 2005/0231675 A1 | 10/2005 | Chen et al. | |
| 2006/0033852 A1 | 2/2006 | Kim | |
| 2007/0052899 A1 * | 3/2007 | Lin et al. | 349/141 |
| 2008/0212013 A1 | 9/2008 | Kitagawa et al. | |
| 2009/0310077 A1 * | 12/2009 | Kim et al. | 349/151 |
| 2010/0225842 A1 * | 9/2010 | Hur et al. | 349/39 |
| 2010/0231819 A1 * | 9/2010 | Lee et al. | 349/43 |

FOREIGN PATENT DOCUMENTS

| | | |
|---|---|---|
| JP | 2006-053555 A | 2/2006 |
| JP | 2006-189763 | 7/2006 |
| KR | 1020060120917 A | 11/2006 |
| KR | 10-0689312 B | 2/2007 |
| KR | 1020080072291 A | 8/2008 |
| KR | 1020070054279 | * 12/2008 |
| KR | 1020080106635 A | 12/2008 |
| KR | 1020090077721 A | 7/2009 |
| KR | 1020100012080 A | 2/2010 |

* cited by examiner

*Primary Examiner* — Bumsuk Won
*Assistant Examiner* — Jia Pan
(74) *Attorney, Agent, or Firm* — Innovation Counsel LLP

(57) ABSTRACT

In a liquid crystal display according to an exemplary embodiment of the present invention, a shielding electrode applied with the same voltage as a common voltage and overlapping a data line is not formed. Instead, an opening is formed at a position corresponding to a data line disposed proximate to a sub-pixel charged with a relatively low voltage. In this manner, luminance deterioration of a liquid crystal display may be reduced or prevented, and a short defect between the shielding electrode and the data line may also be prevented.

10 Claims, 11 Drawing Sheets

LIQUID CRYSTAL DISPLAY

CROSS-REFERENCE TO RELATED APPLICATION

This application claims priority to, and the benefit of, Korean Patent Application No. 10-2011-0032590 filed in the Korean Intellectual Property Office on Apr. 8, 2011, the entire contents of which are incorporated herein by reference.

BACKGROUND OF THE INVENTION (a) Field of the Invention

Embodiments of the present invention relate generally to liquid crystal displays. More specifically, embodiments of the present invention relate to liquid crystal displays having reduced parasitic capacitance.

(b) Description of the Related Art

A liquid crystal display is currently one of the most widely used types of flat panel displays. The typical liquid crystal display includes two display panels on which field generating electrodes such as a pixel electrode and a common electrode are formed, and a liquid crystal layer that is disposed therebetween. An image is displayed by applying a voltage to a field generating electrode to generate an electric field on the liquid crystal layer, which determines alignment of liquid crystal molecules of the liquid crystal layer and controls polarization of incident light.

The liquid crystal display also includes switching elements connected to individual pixel electrodes, and a plurality of signal lines, such as gate lines and data lines, for controlling the switching elements so as to apply voltages to the pixel electrodes.

Different methods exist for driving the liquid crystal display. In one method, data voltages of the same polarity are applied in a pixel column direction. However, in this driving method, a charging capacitance charged to the liquid crystal layer for each pixel column is altered by unnecessary coupling between a voltage applied to a data line and a voltage applied to a common electrode, such that display quality may be decreased.

To prevent undesired capacitive coupling between the data line and the common electrode, a conventional solution involves a shielding electrode applied with the same voltage as the common voltage applied to the common electrode. However, when using this shielding electrode, luminance of the liquid crystal display is reduced and a short between the shielding electrode and the data line may be generated, reducing yield of the liquid crystal display.

The above information disclosed in this Background section is only for enhancement of understanding of the background of the invention and therefore it may contain information not in the prior art.

SUMMARY OF THE INVENTION

The present invention prevents or reduces capacitive coupling between a data line and a common electrode, to prevent reduction in display quality of a liquid crystal display, to reduce deterioration of luminance of the liquid crystal display, and to improve process yield.

A liquid crystal display including a plurality of pixels arranged at least approximately in a matrix according to an exemplary embodiment of the present invention comprises: a plurality of pixel electrodes disposed on a first substrate and each including a first sub-pixel electrode and a second sub-pixel electrode; a plurality of data lines connected to the pixel electrode; a common electrode disposed on a second substrate facing the first substrate, the common electrode including a plurality of openings; and a liquid crystal layer disposed between the first substrate and the second substrate. The openings are each disposed at a position corresponding to at least a portion of one of the data lines, and are each disposed proximate to at least one of the second sub-pixel electrodes.

Each of the pixels may further comprise first and second capacitors, the first and second capacitors respectively comprising one of the first and one of the second sub-pixel electrodes, the first and second capacitors configured to maintain differing charge levels.

The common electrode may have a plurality of domain dividing means, and the openings may be connected to the domain dividing means.

The liquid crystal display may further comprise at least three pixels positioned adjacent to each other in a pixel column direction, wherein the openings are not present in at least one of the pixels.

The pixel without openings may represent a green color.

The liquid crystal display may be driven while a polarity is changed per pixel column.

The liquid crystal display may further include: a plurality of first thin film transistors connected to the first sub-pixel electrodes; a plurality of second thin film transistors connected to the second sub-pixel electrodes; a plurality of third thin film transistors connected to the second sub-pixel electrodes; a plurality of first gate lines connected to the first and second thin film transistors; a plurality of second gate lines connected to the third thin film transistors; and a capacitor electrode line including a capacitor electrode overlapping the drain electrode of the third thin film transistor.

The common electrode may include a plurality of domain dividing means, and the openings may be connected to the domain dividing means.

A distance between an edge of the data line and an edge of the common electrode may be in the range of about 3 μm to about 6 μm.

According to an exemplary embodiment of the present invention, without the shielding electrode, unnecessary capacitive coupling between the data line and the common electrode may be prevented and display quality deterioration may be avoided. Also, luminance deterioration of the liquid crystal display may be reduced and process yield may be increased.

DETAILED DESCRIPTION OF THE EMBODIMENTS

Figure 1:
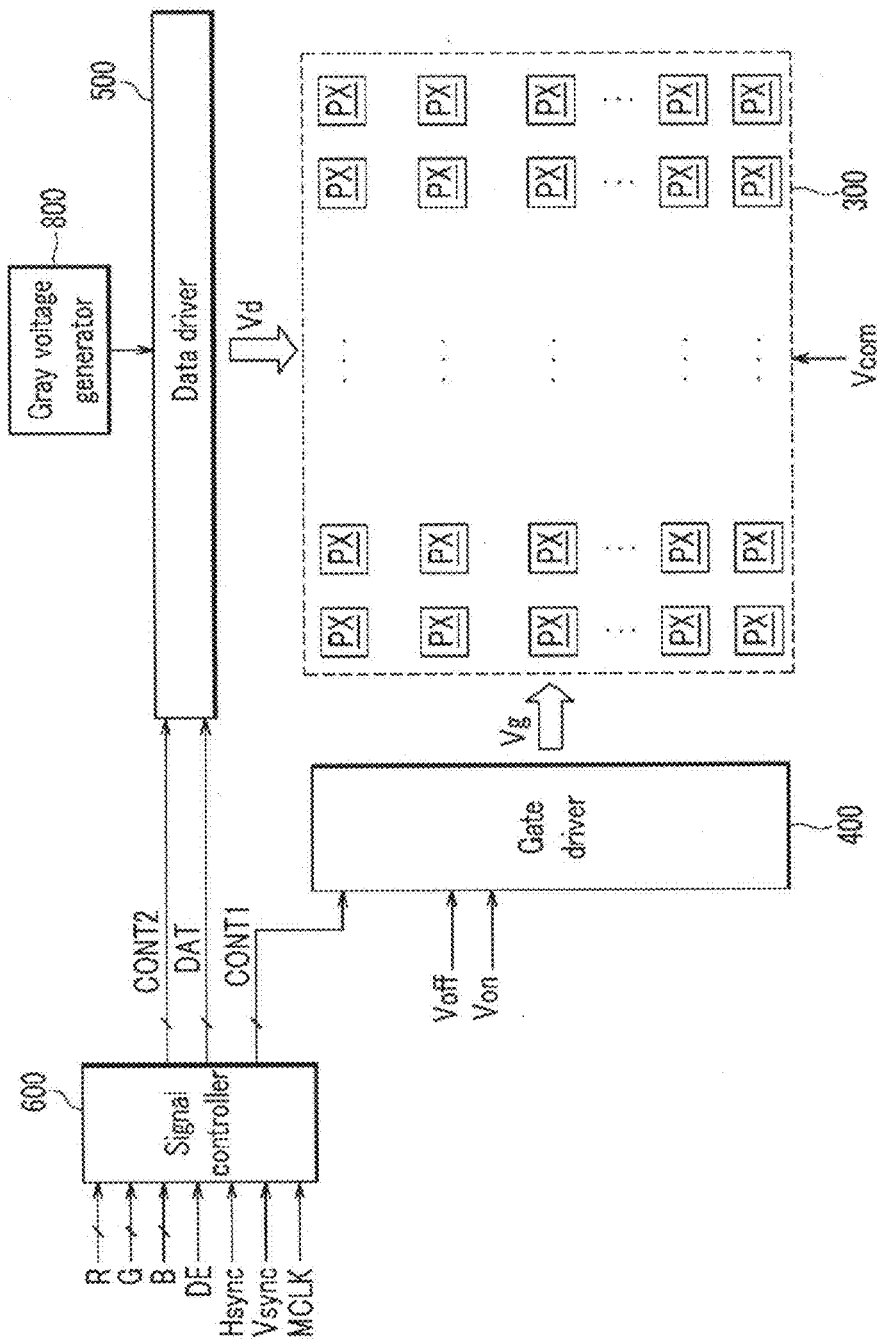
FIG. 1 is a block diagram of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention will be described with reference to FIG. 1 to FIG. 3.

Figure 2:
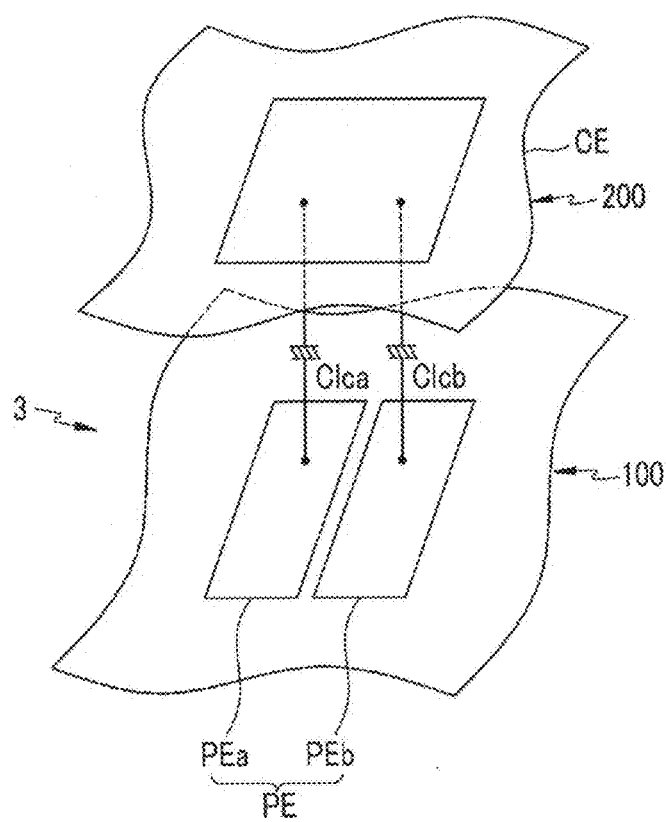
FIG. 2 is a view showing a structure of a liquid crystal display and an equivalent circuit of two sub-pixels according to an exemplary embodiment of the present invention.
Figure 3:
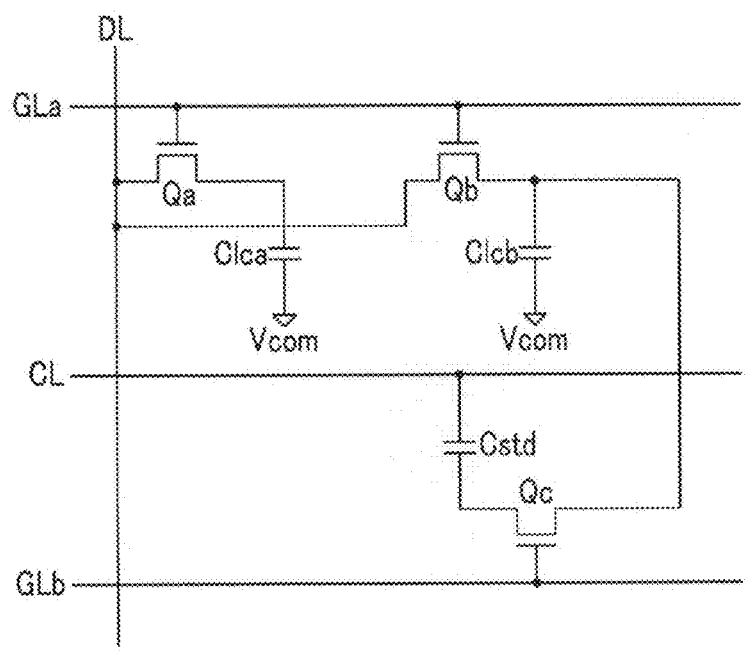
FIG. 3 is an equivalent circuit diagram of one pixel of a liquid crystal display according to an exemplary embodiment of the present invention.

FIG. 1 is a block diagram of a liquid crystal display according to an exemplary embodiment of the present invention, FIG. 2 is a view showing a structure of a liquid crystal display and an equivalent circuit of two sub-pixels according to an exemplary embodiment of the present invention, and FIG. 3 is an equivalent circuit diagram of one pixel of a liquid crystal display according to an exemplary embodiment of the present invention.

As shown in FIG. 1, a liquid crystal display according to an exemplary embodiment of the present invention includes a liquid crystal panel assembly 300, a gate driver 400, a data driver 500, a gray voltage generator 800, and a signal controller 600.

An equivalent circuit representation of liquid crystal panel assembly 300 includes a plurality of signal lines GLa, GLb, DL, and CL (referring to FIG. 3), and a plurality of pixels PX that are connected thereto and arranged approximately in a matrix form. Meanwhile, as seen from the structure of FIG. 2, the liquid crystal panel assembly 300 includes a lower panel 100 and an upper panel 200 facing each other, with a liquid crystal layer 3 interposed therebetween.

Referring to FIG. 3, the signal lines include a plurality of gate lines GLa and GLb transmitting gate signals (referred to as "scanning signals"), a plurality of data lines DL transmitting a data voltage Vd, and a plurality of capacitor electrode lines CL transmitting a common voltage Vcom. The gate lines GLa and GLb and the capacitor electrode lines CL extend in an approximate row direction and run substantially parallel to each other, and the data lines DL extend generally in a column direction and run substantially parallel to each other.

The liquid crystal panel assembly according to the present exemplary embodiment includes a plurality of pixels PX connected to the signal lines.

Each of the pixels PX includes a pair of sub-pixels, and each sub-pixel includes liquid crystal capacitors Clca and Clcb. The two sub-pixels include switching elements Qa, Qb, and Qc connected to the gate lines GLa and GLb, the data line DL, and the liquid crystal capacitors Clca and Clcb.

The liquid crystal capacitors Clca and Clcb include sub-pixel electrodes PEa and PEb of the lower display panel 100 and a common electrode CE of the upper display panel 200 as two terminals, respectively, and the liquid crystal layer 3 between the sub-pixel electrodes PEa and PEb and the common electrode CE serves as a dielectric material. The pair of sub-pixel electrodes PEa and PEb are separated from each other, but form one pixel electrode PE. The common electrode CE is formed on substantially the entire surface of the upper display panel 200, and a common voltage Vcom is applied to the common electrode CE. The liquid crystal layer 3 has negative dielectric anisotropy, and liquid crystal molecules of the liquid crystal layer 3 may be aligned such that their major axes are perpendicular to the surfaces of the two display panels when an electric field is not applied. Differently from FIG. 2, the common electrode CE may be formed on the lower display panel 100, and at least one of the two electrodes PE and CE may have a generally linear shape or a generally bar shape.

Meanwhile, in order to realize color display, each pixel PX uniquely displays one primary color (spatial division), or each pixel PX temporally and alternately displays primary colors (temporal division). Then, the primary colors are spatially or temporally synthesized, thus generating desired colors. Examples of the primary colors may include the primary colors red, green, and blue. The liquid crystal display according to the present invention is an example of spatial division. In FIG. 2, each pixel PX has a color filter CF that is disposed in lower panel 100 above or below the sub-pixel electrodes PEa and PEb and that represents one of the primary colors. However, in a liquid crystal display according to another exemplary embodiment of the present invention, the color filter may be formed in a region of the upper panel 200.

Polarizers (not shown) for providing light polarization are provided on outer surfaces of the display panels 100 and 200, and the polarization axes of the two polarizers may be crossed. One of the two polarizers may be omitted in the case of a reflective liquid crystal display. In the case of the crossed polarizers, light incident to the liquid crystal layer 3 is blocked when an electric field is not applied.

Referring again to FIG. 1, the gray voltage generator 800 generates all gray voltages or a predetermined number of the gray voltages (or reference gray voltages) related to transmittance of the pixels PX. The (reference) gray voltages may include one set having a positive value for a common voltage Vcom, and another set having a negative value.

The gate driver 400 is connected to the gate line GLa and GLb of the liquid crystal panel assembly 300, and applies gate signals (obtained by combining a gate-on voltage Von and a gate-off voltage Voff) to the gate lines GLa and GLb.

The data driver 500 is connected to the data lines DL of the liquid crystal panel assembly 300, and selects the data signals from the gray voltage generator 800 to apply them to the data lines DL as data voltages. However, when the gray voltage generator 800 does not supply a voltage for all grays but supplies only a predetermined number of reference gray voltages, the data driver 500 divides the reference gray voltages to select image data signals.

The signal controller 600 controls the gate driver 400 and the data driver 500.

Each of the drivers 400, 500, 600, and 800 may be directly mounted on the liquid crystal panel assembly 300 in the form of at least one IC chip, may be mounted on a flexible printed circuit film (not shown) and then mounted on the liquid crystal panel assembly 300 in the form of a tape carrier package (TCP), or may be mounted on a separate printed circuit board (not shown). Alternatively, the drivers 400, 500, 600, and 800 may be integrated within the liquid crystal panel assembly 300 together with, for example, the signal lines GLa, GLb, and DL and the thin film transistor switching elements Qa, Qb, and Qc. The drivers 400, 500, 600, and 800 may be integrated into a single chip. In this case, at least one of the drivers, or at least one circuit forming the drivers, may be arranged outside the single chip.

Again referring to FIG. 3, the liquid crystal display according to the present exemplary embodiment has signal lines that include neighboring first and second gate lines GLa and GLb, a data line DL, and a storage electrode line SL, as well as a plurality of pixels PX that are connected to the signal lines.

The pixel PX includes first, second, and third switching elements Qa, Qb, and Qc, first and second liquid crystal capacitors Clca and Clcb, and a step-down capacitor Cstd.

The first and second switching elements Qa and Qb are each connected to the first gate line GLa and the data line DL, and the third switching element Qc is connected to the second gate line GL.

The first and second switching elements Qa and Qb are three terminal elements such as thin film transistors provided in the lower panel 100, the control terminals of which are connected to the first gates line GLa, the input terminals of which are connected to the data line DL, and the output terminals of which are respectively connected to the first/second liquid crystal capacitors Clca/Clcb.

The third switching element Qc is also a three terminal element such as a thin film transistor provided in the lower panel 100, the control terminal of which is connected to one of the second gate lines GLb, the input terminal of which is connected to the second liquid crystal capacitor Clcb, and the output terminal of which is connected to the step-down capacitor Cstd.

The step-down capacitor Cstd is connected between the output terminal of the third switching element Qc and the capacitor electrode line CL, and is formed by overlapping the capacitor electrode line CL provided in the lower panel 100 and the output electrode of the third switching element Qc with an insulator formed or positioned therebetween.

Now, an operation of the liquid crystal display according to the present exemplary embodiment will be described in detail with reference to FIG. 1 to FIG. 3.

Referring to FIG. 1, the signal controller 600 receives input image signals R, G, and B, as well as input control signals for controlling those input image signals, from an external graphics controller (not shown). The input image signals R, G, and B contain information regarding luminance of the respective pixels PX, which has a predetermined number of grays, for example $1024=2^{10}$, $256=2^8$, or $64=2^6$ grays. The input control signals include vertical synchronization signals Vsync, horizontal synchronization signals Hsync, main clock signals MCLK, and data enable signals DE.

The signal controller 600, based on the received input image signals R, G, and B and the input control signals, properly processes the input image signals R, G, and B in accordance with the operating conditions of the liquid crystal panel assembly 300, and generates gate control signals CONT1 and data control signals CONT2. Then, the signal controller 600 transmits the gate control signals CONT1 to the gate driver 400, while transmitting the data control signals CONT2 and the processed image signals DAT to the data driver 500. The output image signals DAT have a predetermined number of values or grays as digital signals.

Depending upon the values of the data control signals CONT2 received, the data driver 500 receives the digital image signals DAT for one row of pixels PX, converts the digital image signals DAT gray voltages into analog data voltages by selecting gray voltages corresponding to the respective digital image signals DAT, and applies them to the relevant data lines DL.

Upon receipt of the gate control signals CONT1 from the signal controller 600, the gate driver 400 applies gate-on voltages Von to the gate lines GLa and GLb so as to turn on the switching elements Qa, Qb, and Qc. Then, the data voltages Vd applied to the data lines DL are applied to the relevant pixels PX through the turned-on first and second switching elements Qa and Qb.

Description will now be given with respect to a particular row of pixels, for example the i-th pixel row.

A first gate signal is applied to the first gate line GLa of the i-th pixel row, and a second gate signal is applied to the second gate line GLb thereof. When the first gate signal shifts from the gate-off voltage Voff to the gate-on voltage Von, the first and second switching elements Qa and Qb connected thereto are turned on. Accordingly, the data voltage Vd applied to the data line DL is applied to the first and second sub-pixel electrodes PEa and PEb through the turned-on first and second switching elements Qa and Qb. In this case, the data voltages Vd applied to the first and second sub-pixel electrodes 191a and 191b are identical to each other. The first and second liquid crystal capacitors Clca and Clcb are charged with the same value as a difference between the common voltage and the data voltage Vd.

Thereafter, when the first gate signal shifts from the gate-on voltage Von to the gate-off voltage Voff, and the second gate signal shifts from the gate-off voltage Voff to the gate-on voltage Von, the first and second switching elements Qa and Qb turn off, while the third switching element Qc turns on. Thus, charge is moved from the second sub-pixel electrode PEb to the step-down capacitor Cstd through the third switching element Qc. Consequently, the voltage charged at the second liquid crystal capacitor Clcb is lowered, while the step-down capacitor Cstd is charged. The voltage charged at the second liquid crystal capacitor Clcb is lowered by the capacitance of the step-down capacitor Cstd, so that the voltage charged at the second liquid crystal capacitor Clcb is lower than that of the first liquid crystal capacitor Ccla.

The voltages charged at the two liquid crystal capacitors Clca and Clcb express different gamma curves, which overall present a complex gamma curve for the pixel. This can be further expressed as a frontal complex gamma curve which coincides with the reference gamma curve at the front side, and a lateral gamma curve which approximates the frontal reference gamma curve. In this way, the image data are converted so that lateral visibility is improved.

The above process is repeated for successive unit horizontal periods, which are each also called "1H" and are the same duration as one cycle of the horizontal synchronization signal Hsync and the data enable signal DE, thereby applying data voltages Vd to all the pixels PX and displaying images of one frame.

After one frame terminates, the next frame begins, and a reverse signal applied to the data driver 500 is controlled such that the data voltage Vd applied to each pixel PX is opposite in polarity to that of the previous frame.

The voltages charged at the first and second liquid crystal capacitors Clca and Clcb may be controlled according to the capacitance of the step-down capacitor Cstd.

Figure 4:
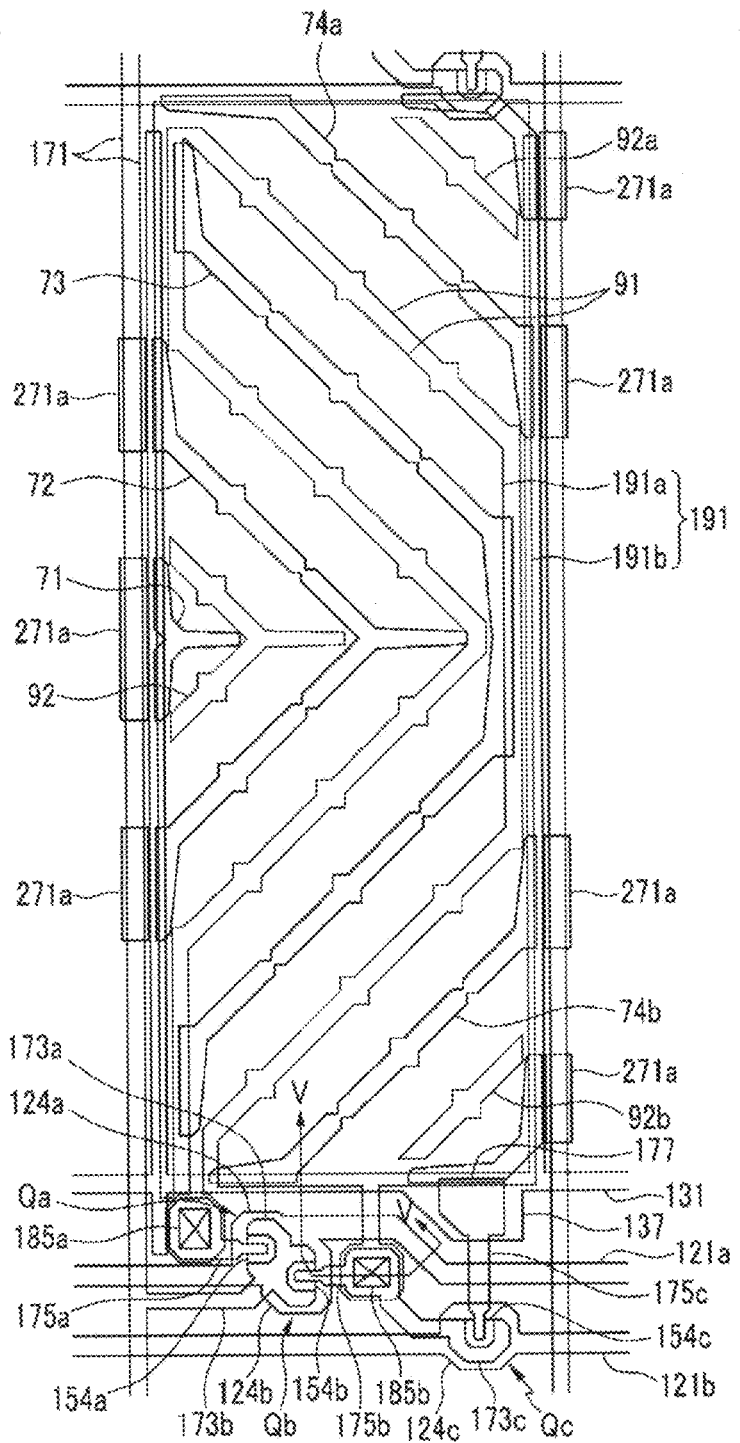
FIG. 4 is a layout view of a liquid crystal display according to an exemplary embodiment of the present invention.
Figure 5:
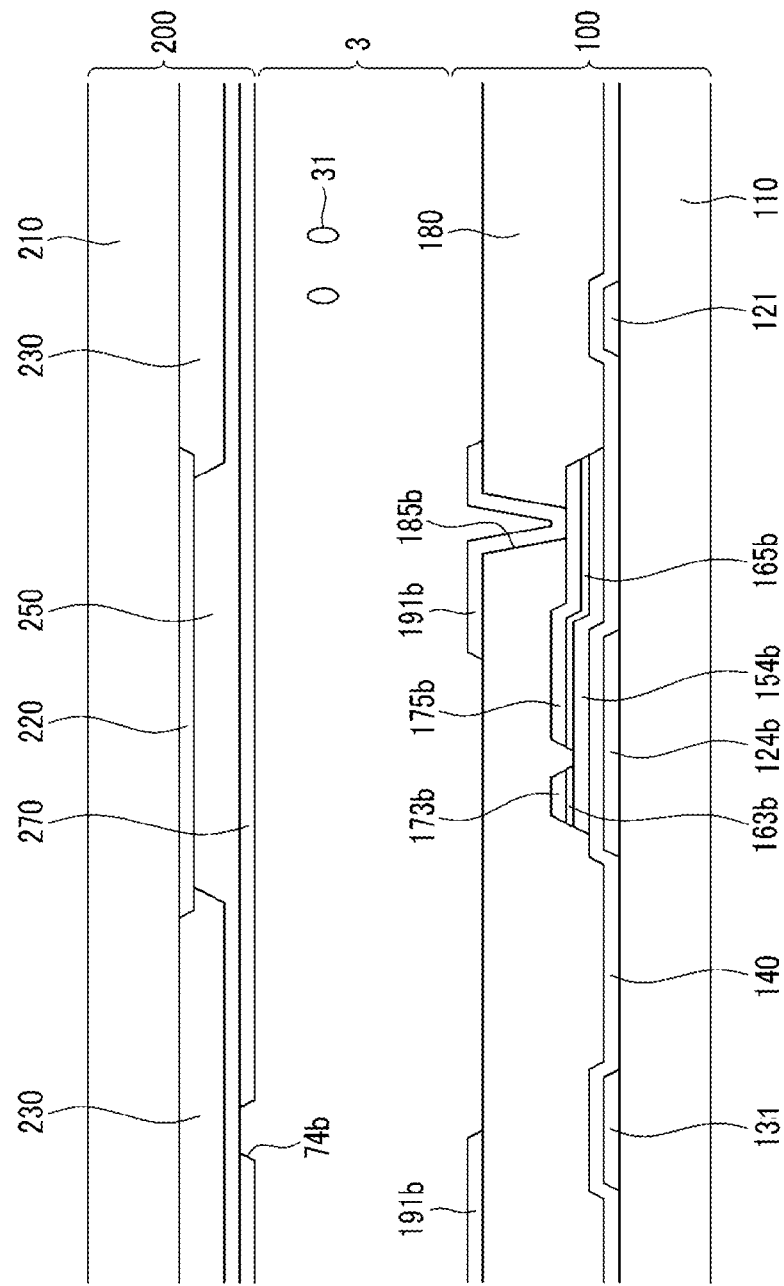
FIG. 5 is a cross-sectional view of the liquid crystal display shown in FIG. 4 taken along the line V-V.
Figure 6:
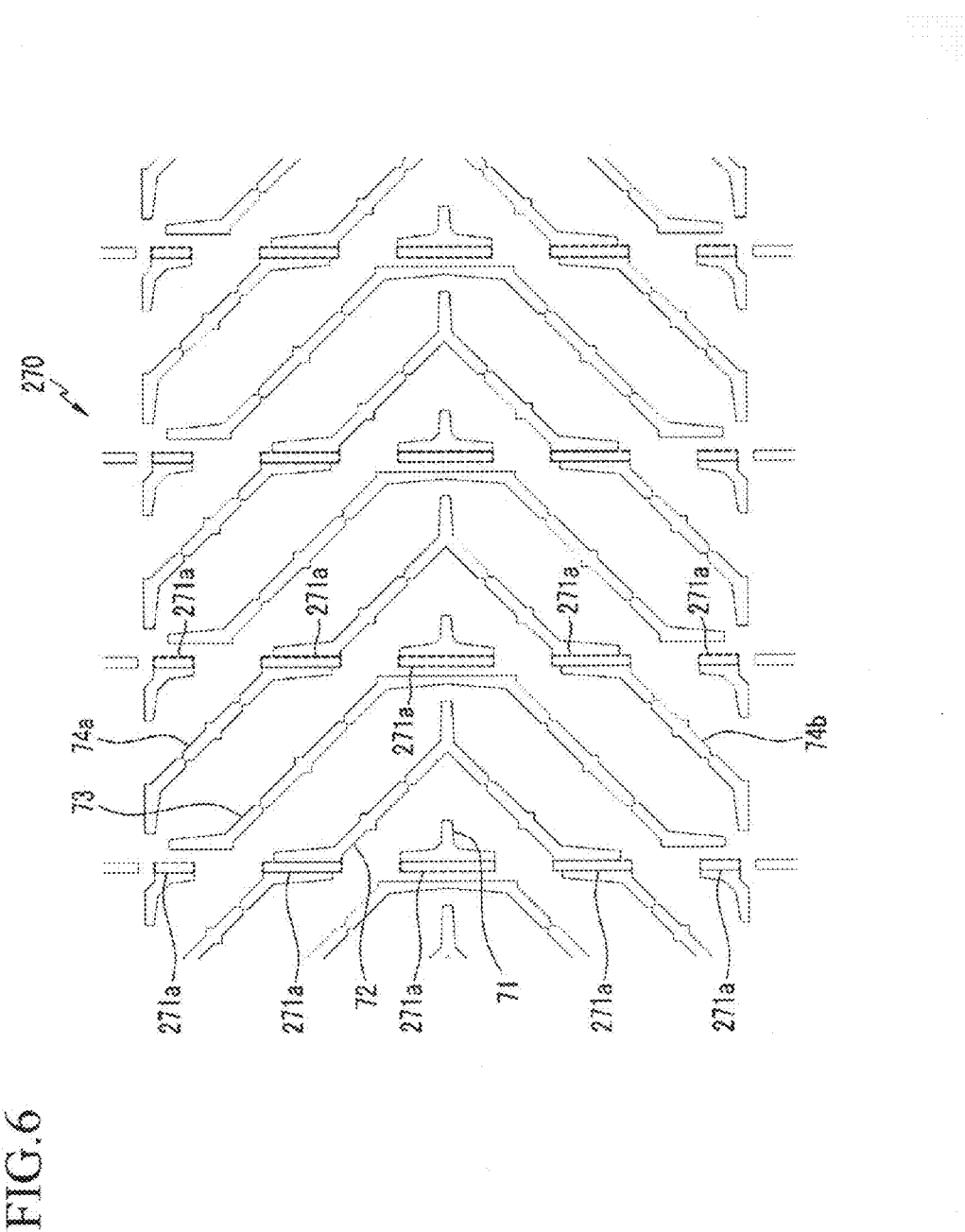
FIG. 6 is a layout view of a common electrode of the liquid crystal display of FIG. 4.

A liquid crystal display according to another exemplary embodiment of the present invention will now be described in detail with reference to FIG. 4 to FIG. 6 and FIG. 3. FIG. 4 is a layout view of a liquid crystal display according to an exemplary embodiment of the present invention, FIG. 5 is a cross-sectional view taken along the line V-V of FIG. 4, and FIG. 6 is a layout view of a common electrode of the liquid crystal display of FIG. 4.

The liquid crystal display according to the present exemplary embodiment includes the lower panel 100 and the upper panel 200, and the liquid crystal layer 3 interposed between the two display panels 100 and 200.

Firstly, the lower panel 100 will be described.

A plurality of gate conductors including a first gate line 121a, a second gate line 121b and capacitor voltage lines 131 are formed on an insulation substrate 110. The first gate line 121a includes a first gate electrode 124a and a second gate electrode 124b, and the second gate line 121b includes a third gate electrode 124c.

The capacitor voltage lines 131 transmit a predetermined voltage, for example a capacitor voltage, and include a capacitor electrode 137 expanded outward from the voltage line 131 to create a relatively wide area for forming a capacitor.

A gate insulating layer 140 is formed on the gate conductors 121 and 131. A semiconductor stripe (not shown) is formed on the gate insulating layer 140. The semiconductor stripe includes a stem mainly extending in the longitudinal direction, and a plurality of first, second, and third branches 154a, 154b, and 154c extending toward the first, second, and third gate electrodes 124a, 124b, and 124c. The first, second, and third branches 154a, 154b, and 154c respectively include first to third element portions (not shown) respectively disposed on the first to third gate electrodes 124a, 124b, and 124c. The third branch 154c is extended to form a fourth branch (not shown).

The semiconductors 154a, 154b, and 154c may be made of an organic material. The organic semiconductor may include a derivative including a substituent of tetracene or pentacene, and an oligothiophene including four to eight thiophenes connected at second and fifth positions of a thiophene ring. The organic semiconductor may include polythienylene vinylene, poly3-hexylthiophene, polythiophene, phthalocyanine, metallized phthalocyanine, or their halogen derivatives. The organic semiconductor may also include perylene tetracarboxylic dianhydride, (PTCDA), naphthalene tetracarboxylic dianhydride (NTCDA), or their imide derivatives. The organic semiconductors may include perylene or coronene, and a derivative including their substituents. Any suitable combination or permutation of these materials is contemplated.

An ohmic contact stripe (not shown), a first ohmic contact island 165b, a second ohmic contact island (not shown), and a third ohmic contact island (not shown) are formed on the semiconductors 154a, 154b, and 154c. The ohmic contact stripe includes a first protrusion forming a pair along with the first ohmic contact island and disposed on the first protrusion 154a of the semiconductor, a second protrusion 163b forming a pair along with the second ohmic contact island and disposed on the second protrusion of the semiconductor, and a third protrusion (not shown) forming a pair along with the third ohmic contact island and disposed on the third protrusion of the semiconductor. When the semiconductors 154a, 154b, and 154c are made of an oxide semiconductor, the ohmic contact may be omitted.

A plurality of data conductors, including a plurality of data lines 171 and a plurality of first electrode members 175a, second electrode members 175b and 173c, and third electrode members 175c, are formed on the ohmic contacts 163b and 165b and the gate insulating layer 140.

Each data line 171 includes a plurality of first and second source electrodes 173a and 173b, and an end portion (not shown) having a large area for contact with another layer or an external driving circuit.

The first electrode member 175a forms a first drain electrode 175a, the second electrode member includes a second drain electrode 175b and a third source electrode 173c that are connected to each other, and the third electrode member 175c forms a third drain electrode 175c.

The first, second, and third drain electrodes 175a, 175b, and 175c respectively include one end portion with a wide area and the other end portion with a bar type shape. The bar end portions of the first/second/third drain electrodes 175a/175b/175c are enclosed by the first/second/third source electrodes 173a/173b/173c. The third source electrode 173c is connected to the wide end portion of the second drain electrode 175b.

The semiconductors 154a, 154b, and 154c have substantially the same plane shape as portions of the data lines 171, the first to third electrode members 175a, 175b, 173c, and 175c, and the underlying ohmic contacts 163b and 165b. However, the semiconductor stripe also includes exposed portions that are not covered by the source electrodes 173a-c and the drain electrodes 175a-c, and portions that are disposed between the data lines 171 and the drain electrodes 175a-c.

In a manufacturing method of the thin film transistor array panel 100 according to an exemplary embodiment of the present invention, the data conductors 171, 175a, and 175c, the semiconductors 154a-c, and the ohmic contacts 163b and 165b are formed through one photolithography process.

A photosensitive film used in this photolithography process has different thicknesses depending on positions, and particularly includes a first portion and a second portion that is thinner than the first portion. The first portion is located at a wiring region in which the data line 171 and the drain electrodes 175a, 175b, and 175c are located, and the second portion is located at a channel region of the thin film transistor.

There are many methods of forming a photosensitive film having differing thicknesses at different locations. One such method includes forming a photomask with a translucent area as well as a light transmitting area and a light blocking area. The translucent area is provided with a slit pattern or a lattice pattern, or as a thin film having medium transmittance or thickness. For the slit pattern, it is preferable that the slit width, or the space between the slits, is smaller than the resolution of exposure equipment used in the photolithography process. Another exemplary method includes using a reflowable photosensitive film. That is, a thin portion is formed by forming a reflowable photosensitive film with a general exposure mask having only a light transmitting area and a light blocking area, then flowing some photosensitive film material onto those areas that are intended to be thinner.

Since this reduces time for the photolithography process, the manufacturing method is shortened and simplified.

The first/second/third gate electrodes 124a/124b/124c, the first/second/third source electrodes 173a/173b/173c, and the first/second/third drain electrodes 175a/175b/175c respectively form the first/second/third thin film transistors (TFTs) Qa/Qb/Qc along with the first/second/third semiconductor islands 154a/154b/154c, and the channels of the thin film transistors are respectively formed in the semiconductors 154a/154b/154c between the source electrodes 173a/173b/173c and the drain electrodes 175a/175b/175c.

A passivation layer 180 is formed on the data conductors 171, 175a, 175b, and 175c and the exposed semiconductors 154a, 154b, and 154c. The passivation layer 180 is made of an inorganic insulator such as silicon nitride or silicon oxide.

The passivation layer 180 has a plurality of contact holes 185a, 185b respectively exposing the wide end portion of the first drain electrode 175a and the wide end portion of the second drain electrode 175b.

A plurality of pixel electrodes 191, including first and second sub-pixel electrodes 191a and 191b, and a plurality of contact assistants (not shown) are formed on the passivation layer 180. The pixel electrodes 191 and the contact assistants are formed of a transparent material such as ITO and IZO.

The first sub-pixel electrode 191a and the second sub-pixel electrode 191b are positioned with a gap 91 interposed therebetween, and the first sub-pixel electrode 191a is enclosed by the second sub-pixel electrode 191b. The second sub-pixel electrode 191b has a plurality of domain diving means 92, 92a, and 92b. The domain diving means 92, 92a, and 92b may be cutouts.

The first/second sub-pixel electrodes 191a/191b are connected to the first/second drain electrodes 175a/175b through the first/second contact holes 185a/185b, and receive data voltages Vd from the first/second drain electrodes 175a/175b. When respective voltages are applied to the first/second sub-pixel electrodes 191a/191b and the common electrode 270 of the common electrode panel 200, the opposing electrodes generate an electric field that determines the orientations of liquid crystal molecules 31 of the liquid crystal layer 3 between the two electrodes 191 and 270. Accordingly, the luminance of the light transmitted through the liquid crystal layer 3 differs depending on the thusly determined orientation of the liquid crystal molecules.

The capacitor electrode 137 and the wide end portion 177 of the third drain electrode 175c overlap with the gate insulating layer 140 and the semiconductor layer positioned inbetween, thereby forming the step-down capacitor Cstd. That is, the step-down capacitor Cstd is formed from the gate conductor and the data conductor, so that it is not necessary to add a separate process to form the step-down capacitor Cstd. This simplifies the manufacturing process of the liquid crystal display. Additionally, the gate insulating layer 140 and the semiconductor layers are the only layers present between the two electrodes of the step-down capacitor Cstd, such that the capacitance of the step-down capacitor Cstd may be further increased compared with the case in which the passivation layer 180 is also present between two electrodes.

A lower alignment layer (not shown) can be formed on the pixel electrodes 191, the contact assistants, and the passivation layer 180. The lower alignment layer may be a vertical alignment layer.

Now, the upper panel 200 will be described.

A light blocking member 220 is formed on an insulation substrate 210. The light blocking member 220 is also referred to as a black matrix, and prevents light leakage.

A plurality of color filters 230 is formed on the insulation substrate 210 in the regions defined by the light blocking member 220.

The color filters 230 may each display one of the primary colors such as red, green, and blue, or any other desired color, and may be made of an organic material including pigments displaying a color such as one of the three primary colors. In the exemplary embodiment shown, the color filters 230 are formed on the upper panel 200. However, a liquid crystal display according to another exemplary embodiment of the present invention may include color filters 230 that are formed on the lower panel 100. Also, the exemplary embodiment shown includes color filters 230 that are formed through a photolithography process. However, a liquid crystal display according to another exemplary embodiment of the present invention may include color filters 230 formed through a different method such as an Inkjet printing method. In the case of inkjet printing, a partition defining regions where ink is to be dripped may be added on the lower panel 100, where the dripped ink forms the color filters 230. In addition to defining regions for dripped ink, the partition may also act as a light blocking member including black pigments to thereby prevent light leakage.

The light blocking member 220 is formed on the upper panel in this exemplary embodiment. However, the liquid crystal display according to another exemplary embodiment of the present invention may include the light blocking member 220 formed on the lower panel 100. Also, as above-described, when the color filters 230 are formed by an Inkjet printing method, the light blocking member 220 can be formed on the lower panel 100 to act as a partition for dripping ink for the color filters 230 therein.

An overcoat 250 is formed on the light blocking member 220 and the color filter 230. The common electrode 270 is then formed on the overcoat 250. The common electrode 270 includes a plurality of domain diving means 71, 72, 73, 74a, and 74b. The domain diving means 71, 72, 73, 74a, and 74b may be cutouts. Each cutout set 71, 72, 73, 74a, and 74b faces one pixel electrode 191, and the cutouts 71, 72, 73, 74a, and 74b are respectively disposed between the gap 91 and the cutout set 92, 92a, and 92b of the pixel electrode, so that none of the cutouts 71, 72, 73, 74a, and 74b overlaps any of the corresponding cutouts 92, 92a, and 92b.

Also, the common electrode 270 includes a plurality of openings 271a. The openings 271a are disposed at positions corresponding to the data line 171 and adjacent to the second sub-pixel electrode 191b of the pixel electrode 191. Also, the openings 271a each overlap a portion of the data line 171.

It is preferable that the interval between the edge of the data line 171 and the edge of the opening 271a is in the range of about 3 μm to about 6 μm.

An upper alignment layer (not shown) is formed on the common electrode 270. The upper alignment layer may be a vertical alignment layer.

The liquid crystal layer 3 has negative dielectric anisotropy, and the liquid crystal molecules 31 of the liquid crystal layer 3 may be aligned so that a major axis thereof is perpendicular to the surface of the two display panels in the absence of an electric field.

If a common voltage is applied to the common electrode 270 and a data voltage is applied to the pixel electrode 191, an electric field substantially perpendicular to the surface of the display panels 100 and 200 is formed. In response, liquid crystal molecules 31 of the liquid crystal layer 3 change directions so that the major axes thereof become perpendicular to the direction of the electric field. Hereinafter, both the pixel electrode 191 and the common electrode 270 are commonly referred to as "field generating electrodes."

The cutouts 71, 72, 73, 74a, 74b, 92, 92a, and 92b of the field generating electrodes 191 and 270, and the edges of the pixel electrode 191 and the gap 91, distort the electric field so that the resulting field has a horizontal component that determines the tilt directions of the liquid crystal molecules 31. The horizontal component of the main electric field is oriented perpendicular to the cutouts 71, 72, 73, 74a, 74b, 92, 92a, and 92b and the edge of the gap 91 and the pixel electrode 191.

As can be seen, each of the cutout sets 71, 72, 73, 74a, 74b, 92, 92a, and 92b and the gap of the pixel electrode 191 divide the pixel electrode 191 into a plurality of subregions, and each of the subregions has two major edges forming an oblique angle with the main, or outer, edges of the pixel electrode 191. Since the liquid crystal molecules on each subregion tilt perpendicular to the major edges, the azimuthal distribution of the tilt directions are localized to four directions. In this way, the liquid crystal molecules are oriented in a number of different tilt directions, thus increasing the reference viewing angle of the liquid crystal display.

The openings 271a formed in the common electrode 270 will be described with reference to FIG. 6.

As described above, a plurality of openings 271a are formed close to the second sub-pixel electrode 191b of the pixel electrode 191. Also, each opening 271a is positioned to correspond to the data line 171. Further, the opening 271a overlaps a portion of the data line 171 (i.e. in plan view, the openings 271a expose portions of the data line 171).

It is preferable that the interval between the edge of the data line 171 and the nearest edge of the opening 271a is in the range of about 3 μm to about 6 μm.

The opening 271a acts to decrease the parasitic capacitive coupling between the data line 171 of the lower panel 100 and the common electrode 270 of the upper panel 200. Accordingly, deterioration of the display quality by unnecessary coupling between the data line and the common electrode of the liquid crystal display may be reduced or prevented.

Also, the cutout 271a of the common electrode 270 is formed proximate to the second sub-pixel electrode 191b, which is charged with a relatively low voltage. Accordingly, brightness deterioration of the liquid crystal display may be reduced or prevented, as compared to the case that the cutout 271a is disposed proximate to the first sub-pixel electrode 191a (which is charged with a relatively high voltage) or proximate to both the first and second sub-pixel electrodes 191a and 191b.

Also, the cutout 271a of the common electrode 270 may be connected to the cutout sets 71, 72, 73, 74a, and 74b disposed on the two adjacent pixel areas.

As described above, in the liquid crystal display according to an exemplary embodiment of the present invention, openings are formed at positions corresponding to the data line and proximate to the sub-pixel charged with relatively low voltage (as between the two sub-pixel electrodes 191a and 191b), to decrease the coupling between the data line and the common electrode. As a result, deterioration in display quality may be reduced or prevented, and luminance deterioration of the liquid crystal display may also be reduced or prevented. Additionally, as further described below, the configuration of the invention prevents the need for a shielding electrode to be formed on the data line, reducing or eliminating the risk of shorts between the shielding electrode and the data line. Accordingly, yield of the liquid crystal display is kept from being compromised by shorts between the shielding electrode and the data line.

Test results for a configuration constructed according to embodiments of the present invention will now be described.

Table 1 compares the voltage difference A between the common electrode and pixel electrode, and the ratio B of electric field magnitudes of the data line to that of the common electrode, for two different configurations of openings 271a (case 1 and case 2), where the quantities shown are differences between the measured value of A or B for the case 1/case 2 configuration and the measured value of A or B for a conventional configuration with no openings 271 but a shielding electrode. Other significant conditions, besides the presence of a shielding electrode and the openings 271a of the common electrode, are the same between the two cases.

In case 1, the interval between the edge of the data line 171 and the edge of the opening 271a of the common electrode is about 3 μm. In case 2, the corresponding interval is about 5 μm.

TABLE 1

|   | Case 1 | Case 2 |
|---|--------|--------|
| A | 98%    | 98%    |
| B | 83%    | 77%    |

Referring to Table 1 and case 1, when an opening 271a is present in the common electrode, the magnitude of the voltage applied to the common electrode is maintained at about 98% of the voltage magnitude present in a conventional liquid crystal display with a shielding electrode, confirming that the change in voltage due to the opening 271a is small. Also, the magnitude of the electric field between the data line and the common electrode is decreased to about 83% and about 77% of the magnitude present in a conventional display with a shielding electrode.

In summary, when employing a configuration of the present invention, the magnitude of the electric field between the data line and the common electrode is decreased by more than 20%, without substantial change in the magnitude of the voltage applied to the common electrode.

On the other hand, as the interval between the edge of the data line and the edge of the opening 271a of the common electrode is increased, the aperture ratio of the liquid crystal display is decreased. This effect can be reduced by maintaining the interval between the edge of the data line and the opening 271a of the common electrode at less than about 6 μm.

The opening 271a of the common electrode of the liquid crystal display according to another exemplary embodiment of the present invention will be described with reference to FIG. 7.

Figure 7:
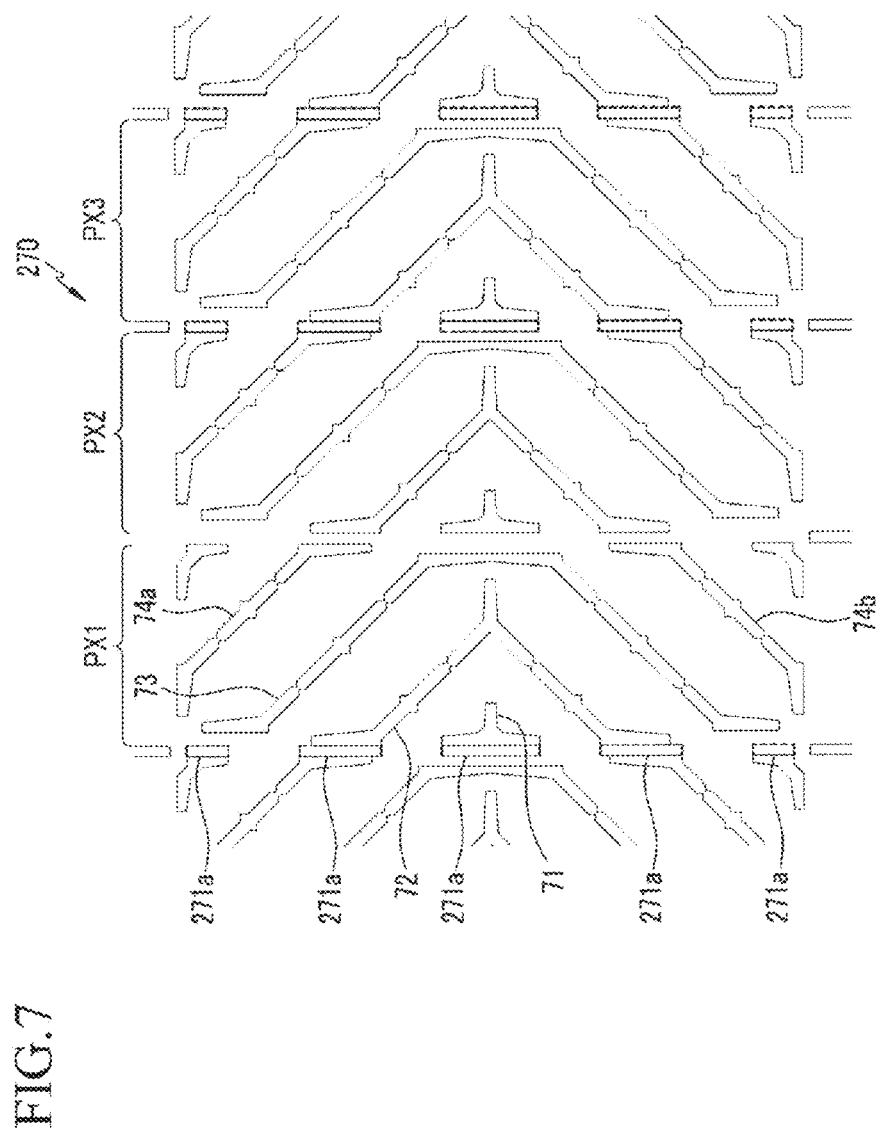
FIG. 7 is a layout view of a common electrode of a liquid crystal display according to another exemplary embodiment of the present invention.

Referring to FIG. 7, a liquid crystal display according to the present exemplary embodiment includes three pixel areas PX1, PX2, and PX3 that are disposed adjacent to each other in a pixel column direction. The opening 271a of the common electrode 270 is not formed at a position corresponding to the data line positioned in the center pixel area PX2. In a case of a liquid crystal display in which the polarity of the liquid crystal is changed according to the pixel column, the polarity of the center pixel PX2 is opposite to that of the two adjacent pixels PX1 and PX3. Accordingly, the opening 271a is formed in at least one of the two pixels PX1 and PX3, and the difference in charging voltage between the two pixels PX1 and PX3 and their center pixel PX2 is decreased such that display quality deterioration (such as vertical lines) may be prevented. Also, when three pixel areas PX1, PX2, and PX3 disposed close to each other in the pixel column direction respectively display red, green, and blue colors, the opening 271a is formed in the common electrode 270 disposed in the red or the blue pixel rather than the green pixel, such that the display quality of the red or blue pixel is increased, and thereby a greenish color of the screen may be prevented. That is, openings 271a are not present in at least one of the pixel areas PX1, PX2, and PX3, thus further improving color quality.

Next, display quality of a liquid crystal display according to an exemplary embodiment of the present invention and a liquid crystal display in which a shielding electrode is formed on a data line as in the conventional art will be described with reference to FIGS. 8A to 8D. FIGS. 8A to 8D are electron-microscopic pictures showing a liquid crystal display constructed according to an embodiment of the present invention.

Figure 8A:
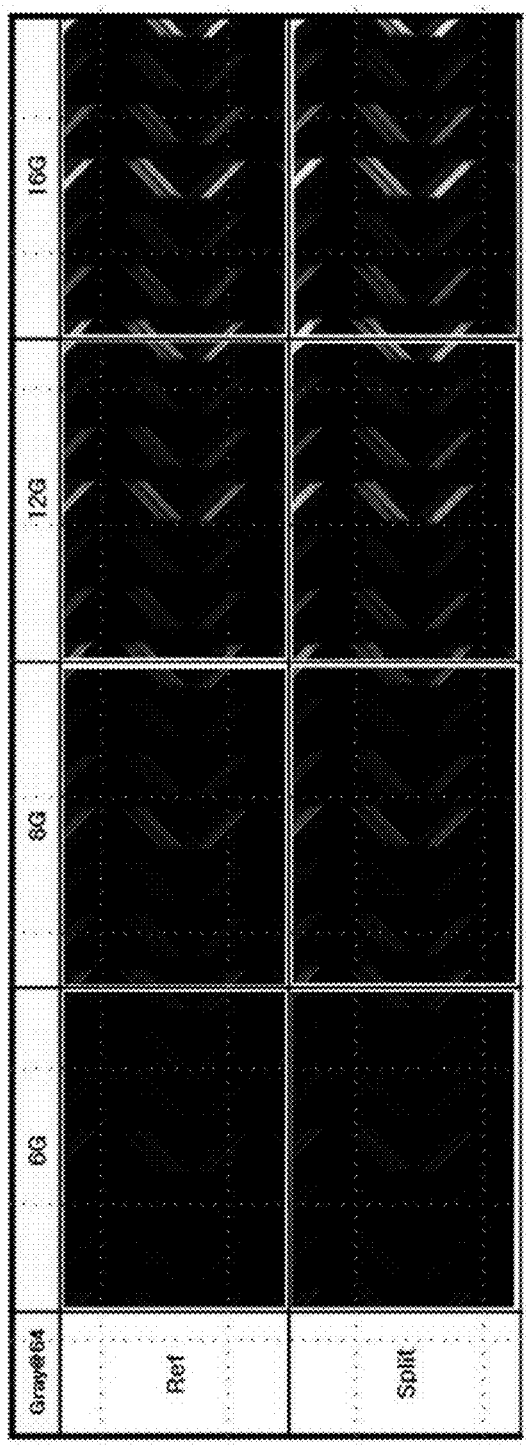
FIGS. 8A to 8D are electron microscopic pictures showing a liquid crystal display according to an experimental example of the present invention.
Figure 8B:
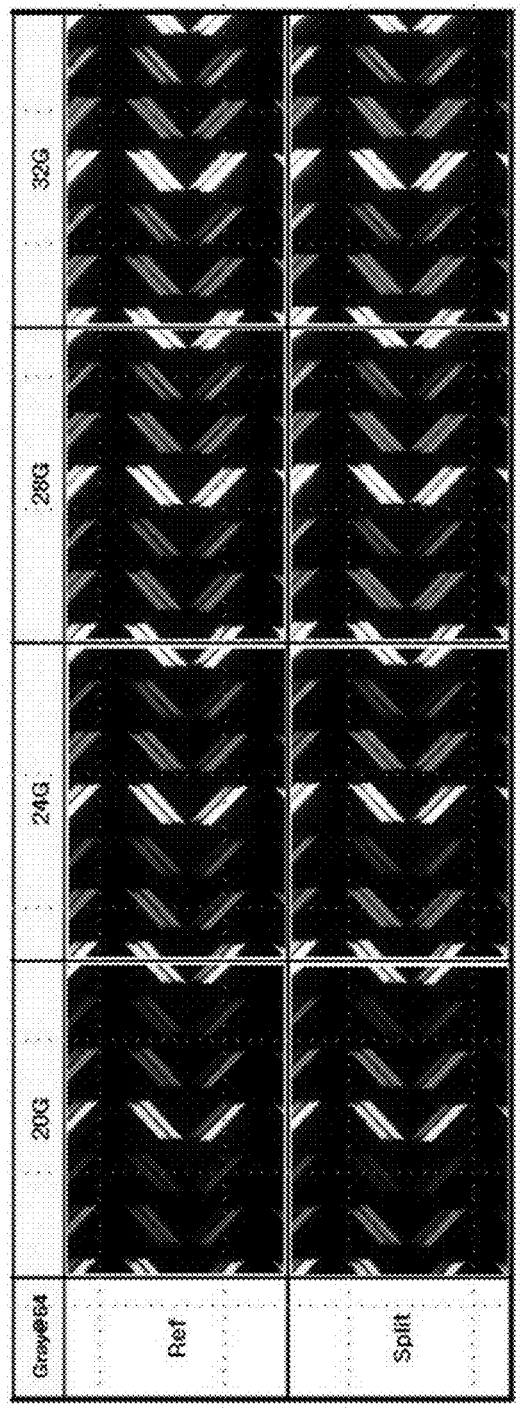
Figure 8C:
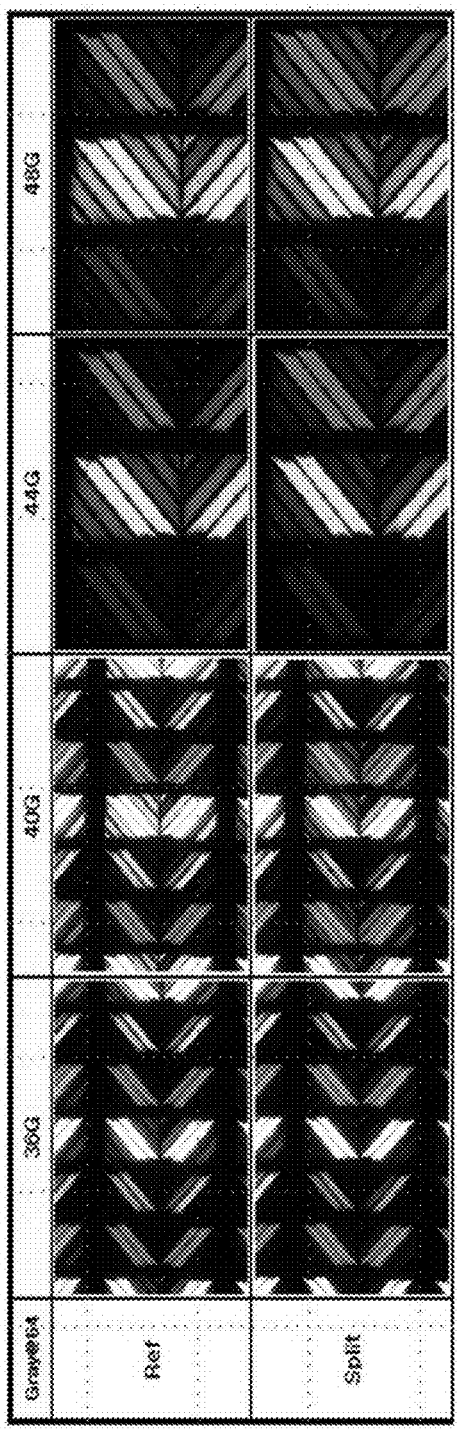
Figure 8D:
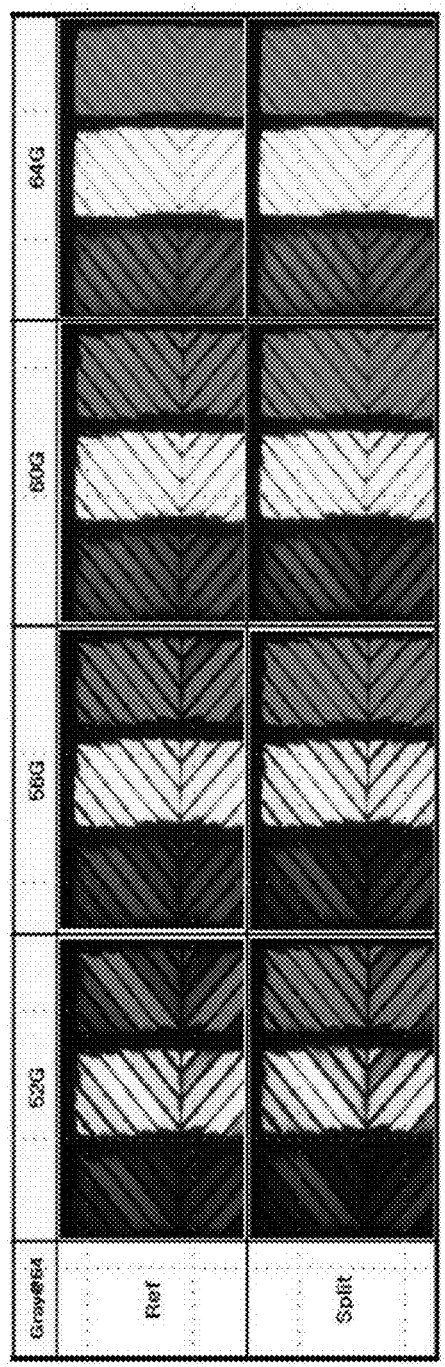

In the present experimental example, pixels are observed for each gray (0-64G) for a case (Ref) having a conventional shielding electrode on the data line and a case (Split) having an opening in the common electrode at the position corresponding to a data line for a sub-pixel charged with a relatively low voltage. FIG. 8A and FIG. 8B show a result from a gray 6G to a gray 32G, and FIG. 8C and FIG. 8D show a result from a gray 36G to a gray 64G.

Referring to FIGS. 8A to 8D, in the case of the liquid crystal display according to an exemplary embodiment of the present invention, like the conventional liquid crystal display in which a shielding electrode is formed on the data line, it may be confirmed that display quality deterioration due to capacitive coupling between the common electrode and the data line largely does not occur, and defects such as texture or light leakage are not generated.

Also, in the liquid crystal display according to an exemplary embodiment of the present invention, a shielding electrode is not formed on the data line as in a conventional liquid crystal display. Instead, one or more openings are formed at positions corresponding to a data line for a sub-pixel charged with relatively low voltage, such that luminance deterioration of the liquid crystal display may be prevented, and shorts between the shielding electrode and the data line may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of Symbols> | |
|---|---|
| 3: liquid crystal layer | 100, 200: display panel |
| 121: gate line | 124a, 124b, 124c: gate electrode |
| 131: capacitor electrode line | 137: capacitor electrode |
| 154a, 154b, 154c: semiconductor | 163b, 165b: ohmic contact |
| 171: data line | 173a, 173b, 173c: source electrode |
| 175a, 175b, 175c: drain electrode | 180: passivation layer |
| 185a, 185b: contact hole | 191: pixel electrode |
| 220: light blocking member | 230: color filter |
| 250: overcoat | 270: common electrode |
| 271a: opening | 300: liquid crystal panel assembly |
| 400: gate driver | 500: data driver |
| 600: signal controller | 800: gray voltage generator |

What is claimed is:

1. A liquid crystal display having a plurality of pixels arranged at least approximately in a matrix, the liquid crystal display comprising:
   a plurality of pixel electrodes disposed on a first substrate and each including a first sub-pixel electrode and a second sub-pixel electrode;
   a plurality of data lines connected to the pixel electrodes;
   a common electrode disposed on a second substrate facing the first substrate, the common electrode including a plurality of openings; and
   a liquid crystal layer disposed between the first substrate and the second substrate,
   wherein the openings are each disposed at a position corresponding to at least a portion of one of the data lines, and are each disposed proximate to at least one of the second sub-pixel electrodes, the openings having edges extending beyond edges of their corresponding data lines by a distance of about 3 µm to about 6 µm, and
   the common electrode disposed in one pixel of three pixels that are adjacent in a pixel column direction does not have the opening.

2. The liquid crystal display of claim 1, wherein
   the magnitude of the voltage charged to the liquid crystal layer corresponding to the second sub-pixel electrode is smaller than the magnitude of the voltage charged to the liquid crystal layer corresponding to the first sub-pixel electrode wherein each of the pixels further comprises first and second capacitors, the first and second capacitors respectively comprising one of the first and one of the second sub-pixel electrodes, the first and second capacitors configured to maintain differing charge levels.

3. The liquid crystal display of claim 2, wherein
   the common electrode has a plurality of domain dividing means, and
   the openings are connected to the domain dividing means.

4. The liquid crystal display of claim 1, wherein the one of three pixels without the openings represents a green color.

5. The liquid crystal display of claim 4, wherein
   the liquid crystal display is driven while a polarity is changed per pixel column.

6. The liquid crystal display of claim 5, further comprising:
   a plurality of first thin film transistors connected to the first sub-pixel electrodes;
   a plurality of second thin film transistors connected to the second sub-pixel electrodes;
   a plurality of third thin film transistors connected to the second sub-pixel electrodes;
   a plurality of first gate lines connected to the first and second thin film transistors;
   a plurality of second gate lines connected to the third thin film transistors; and
   a capacitor electrode line including a capacitor electrode overlapping the drain electrode of the third thin film transistor.

7. The liquid crystal display of claim 1, wherein
   the common electrode includes a plurality of domain dividing means, and
   the openings are connected to the domain dividing means.

8. The liquid crystal display of claim 1, wherein the liquid crystal display is driven while a polarity is changed per pixel column.

9. The liquid crystal display of claim 8, further comprising
   a plurality of first thin film transistors connected to the first sub-pixel electrodes;
   a plurality of second thin film transistors connected to the second sub-pixel electrodes;
   a plurality of third thin film transistors connected to the second sub-pixel electrodes;
   a plurality of first gate lines connected to the first and second thin film transistors;
   a plurality of second gate lines connected to the third thin film transistors; and
   a capacitor electrode line including a capacitor electrode overlapping the drain electrode of the third thin film transistor.

10. The liquid crystal display of claim 1, further comprising:
    a plurality of first thin film transistors connected to the first sub-pixel electrodes;
    a plurality of second thin film transistors connected to the second sub-pixel electrodes;
    a plurality of third thin film transistors connected to the second sub-pixel electrodes;
    a plurality of first gate lines connected to the first and second thin film transistors;
    a plurality of second gate lines connected to the third thin film transistors; and a capacitor electrode line including a capacitor electrode overlapping the drain electrode of the third thin film transistor.

* * * * *